United States Patent [19]

Miaskoff

[11] 4,250,988
[45] Feb. 17, 1981

[54] MECHANISM FOR TRANSFERRING BOOKS AND THE LIKE

[75] Inventor: Leonard Miaskoff, Easton, Pa.

[73] Assignee: Harris Corporation, Melbourne, Fla.

[21] Appl. No.: 35,814

[22] Filed: May 4, 1979

[51] Int. Cl.³ .......................................... B65G 19/00
[52] U.S. Cl. .................................. 198/719; 198/733; 198/734
[58] Field of Search .............. 198/719, 734, 735, 733, 198/749, 723, 725, 644; 270/38; 271/271; 209/917

[56] References Cited

U.S. PATENT DOCUMENTS

| | | | |
|---|---|---|---|
| 2,667,263 | 1/1954 | Bigler et al. | 198/719 X |
| 2,782,900 | 2/1957 | Ferris | 198/734 X |
| 3,200,935 | 8/1965 | Whitfield | 198/735 X |

Primary Examiner—Robert B. Reeves
Assistant Examiner—Douglas D. Watts

[57] ABSTRACT

A mechanism for transferring books or the like between work stations comprises a conveyor chain. A raceway is located along the conveyor chain and supports books thereon. A plurality of pushing devices project from the conveyor chain. Each of the pushing devices has a surface spaced above the raceway for engaging a surface of a book to push the book along the raceway. Each pushing device is attached to the conveyor chain and comprises a pusher finger construction which bends backwardly relative to the direction of movement thereof upon encountering a predetermined resistance to movement of the book pushed thereby and for passing beyond the book providing said predetermined resistance.

2 Claims, 4 Drawing Figures

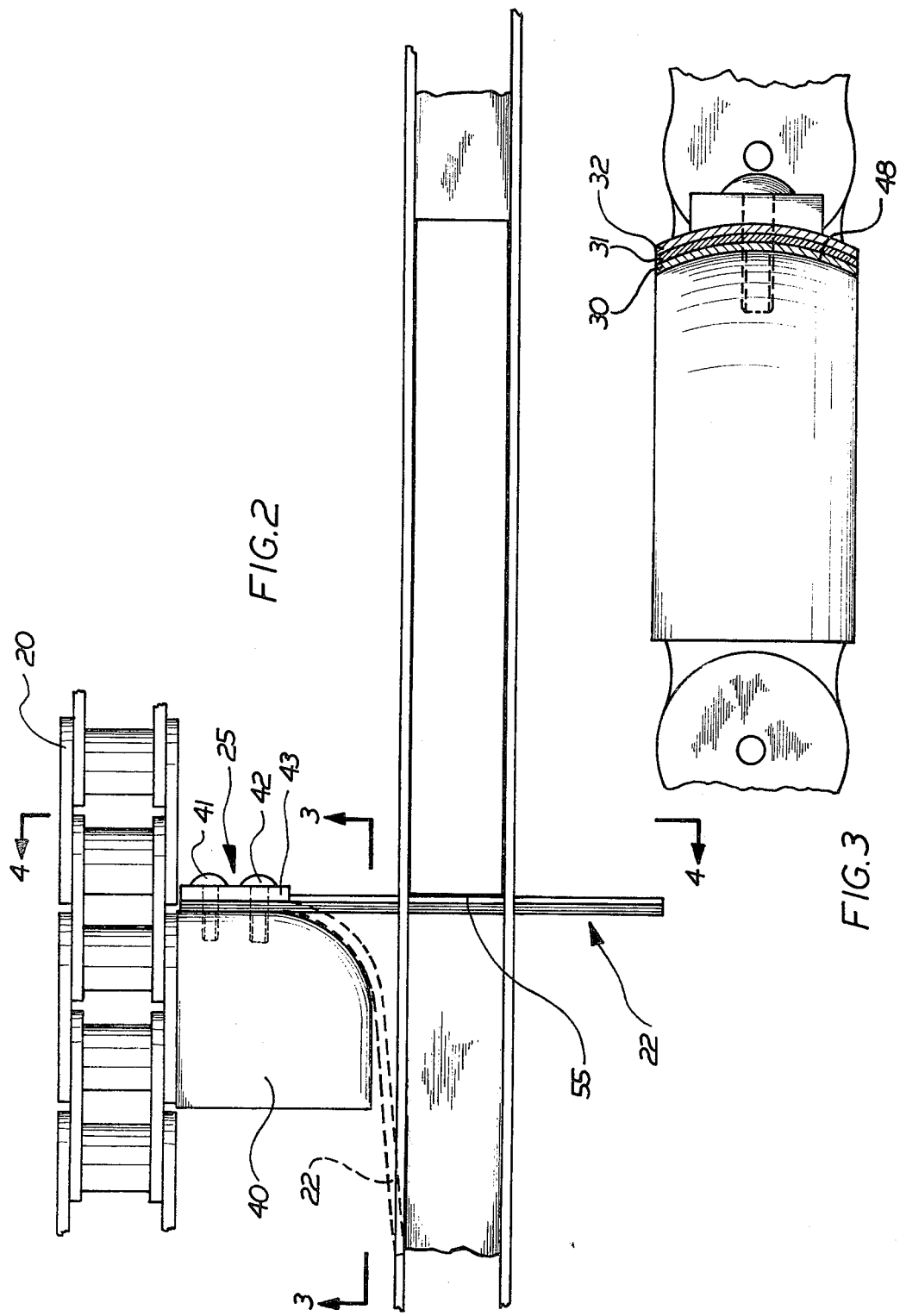

MECHANISM FOR TRANSFERRING BOOKS AND THE LIKE

BACKGROUND AND SUMMARY OF THE PRESENT INVENTION

The present invention relates to a mechanism for transferring books or the like between work stations, and particularly relates to a mechanism for transferring books or the like between work stations in a bindery.

Heretofore various conveyor mechanisms have been used for moving books or the like between the various work stations in a bindery. Typically books are moved by various handling mechanisms between a trimmer and stitching station and also between a stitching station and the binder itself in which the books have a cover applied thereto. Typically these mechanisms for moving the books include chain conveyors with pushers which project above a raceway to engage the book and push the book along the raceway. Many of these pushers have been constructed of plastic or the like material. When the book moved thereby encounters a jam or the like providing a resistance to movement, these pusher pins frequently will break thus causing a stoppage in the machinery and of course a malfunction of the equipment. This necessitates repair of the equipment and can also cause lost time in operation of the entire bindery.

The present invention is directed to the solution of this particular problem and involves the use of a particular type of pusher finger construction which extends above the raceway in order to engage the books on the raceway to push the books along the raceway.

In accordance with the present invention, a pusher finger construction is provided which bends backwardly relative to the direction of movement thereof upon encountering a predetermined resistance to movement of the book which is being pushed thereby. As a result, the pusher finger construction, being moved continuously by the chain conveyor, can move past the book which is jammed. The pusher finger construction comprises at least one resiliently deflectable blade secured at one end to the conveyor chain and projecting in cantilever fashion therefrom over the raceway when pushing a book therealong. For purposes of increasing the force which the pusher finger construction can apply to the book without deflecting rearwardly, a plurality of blades can be utilized as opposed to a single blade.

Each pusher finger construction is secured to the conveyor chain by a lug. The lug has a surface which is curved in a direction extending transverse to the direction of movement of the book and the cantilever blades are likewise correspondingly curved so that the blades engage the lug over a surface area. Further, due to the fact that the blades are curved in a direction extending transverse to the direction of movement of the book the blades are strengthened over and above that provided if the blade were flat.

Further, the lug is curved in a direction parallel to the direction of conveyor movement and as the blades bend rearwardly, they curve around this curve of the lug. Thus when the blades are in the deflected position in which they are bent rearwardly, the blades have a full surface area contact with the lug.

DESCRIPTION OF THE DRAWINGS

Further objects and features of the present invention will be apparent to those skilled in the art to which it relates from the following detailed description thereof made with reference to the accompanying drawings in which:

FIG. 2 is an enlarged fragmentary view of a portion of a mechanism for feeding books used in the system of FIG. 1;

FIG. 3 is a sectional view taken approximately along the line 3—3 of FIG. 2.

DESCRIPTION OF PREFERRED EMBODIMENT

Figure 1:
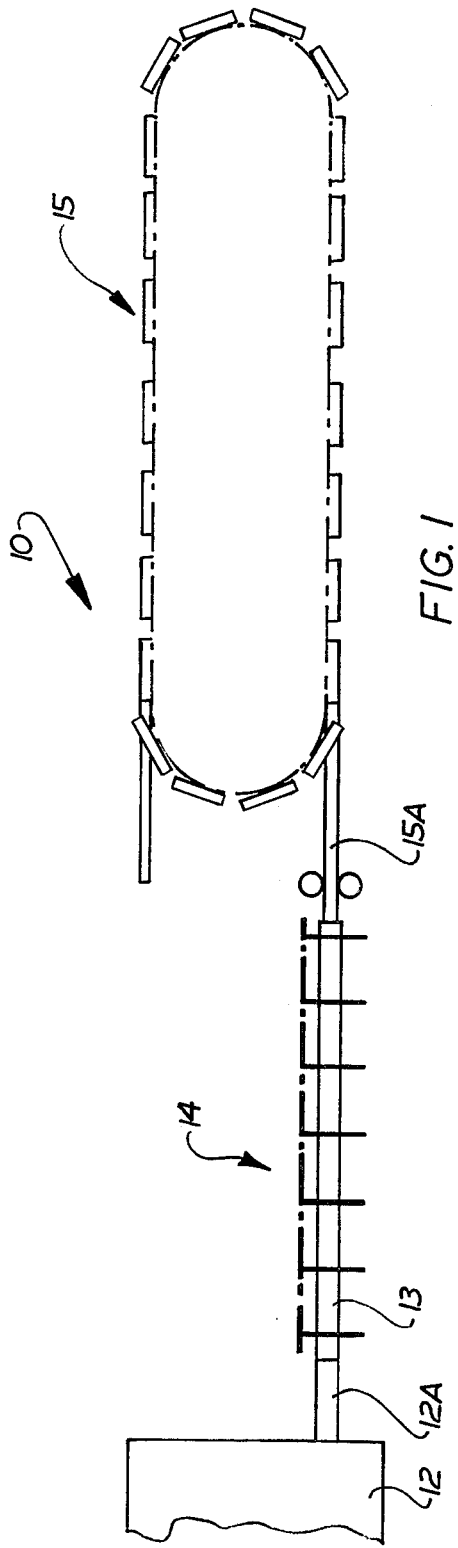
FIG. 1 is a schematic plan view showing a portion of a bindery utilizing the present invention.
Figure 4:
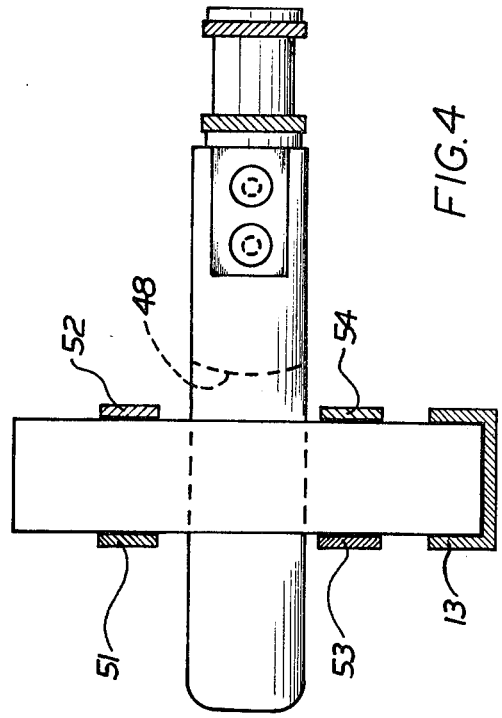
FIG. 4 is a view taken approximately along the section line 4—4 of FIG. 2.

As noted hereinabove, the present invention relates to a mechanism for transferring books or the like between work stations, and particularly between work stations in a bindery. As representative of a preferred embodiment of the present invention, FIG. 1 illustrates the present inention as applied to a bindery system 10. The bindery system 10 includes a stitching mechanism 12 in which books are stitched. The books leave the stitching mechanism 12 and are moved onto a raceway 13. Adjacent the raceway 13 is a conveyor mechanism generally designated 14 which pushes the books along the raceway 13. The conveyor mechanism 14 pushes the books into a binder 15. The binder 15 has a plurality of book clamps which clamp a book and move the book through a plurality of stations for applying a cover to the books as the books are moved. The construction of the stitcher 12 and the binder 15 are conventional and will not be described herein in detail.

It should be apparent that the mechanism 14 effects a transfer of the books between the stitcher 12 and the binder 15 and particularly between the output 12A of the stitcher and to the input 15A of the binder. The manner in which the book is positioned for the conveyor 14 to effect movement of the book and the manner in which the book is picked up from the conveyor 14 are conventional and will not be described herein in detail. Likewise, the sticher and binder mechanisms themselves will not be described herein in detail, in view of the fact that none of these mechanisms form a part of the present invention.

Specifically, the present invention involves the mechanism 14 which transfers books or the like between the work stations 12 and 15. The mechanism 14 includes a chain conveyor 20. The chain conveyor 20 is a continuous chain which is trained around spaced sprockets (not shown). The chain conveyor, of course, extends parallel to the extent of the raceway 13. The chain conveyor may be driven in any suitable manner. The particular drive for the chain conveyor is not shown.

The chain conveyor has a plurality of pusher means attached thereto. Each pusher means comprises a pusher finger construction 22. Each pusher finger construction is attached to the conveyor mechanism by an attaching means generally designated 25.

Each pusher finger construction comprises at least one resiliently deflectable blade which projects outwardly over the raceway 13 in a cantilever fashion from the chain conveyor 20. Each pusher finger construction projects horizontally, however, in certain modifications the construction could extend vertically from a chain. Preferably, each pusher finger construction 22 comprises a series of resiliently deflectable blades which project over the raceway 13. In the preferred embodiment illustrated in the drawings, three blades 30, 31 and 32 comprise the pusher finger construction 22. The blades 30, 31 and 32 have major surfaces which are in abutting engagement. Also the blades are curved in a direction transverse to their length. This curved configuration of the blades is in a direction transverse to the direction of movement of the biases and also transverse, of course, to the direction of movement of the books. This curved configuration of the blades gives the blades a degree of strength that they would not have if they were flat.

The attaching means 25 for attaching each pusher finger construction 22 to the chain conveyor 20 includes a lug 40 which is suitably secured to the chain conveyor 20 in any particular manner. The pusher finger construction 22 is secured to the lug 40 by a pair of screws 41 and 42 which extend through a clamp bar 43 and clamp the blades 30, 31 and 32 to the lug 40.

The lug 40 is constructed and shaped so as to provide a surface area contact between the pusher finger constructions 22 and the lug 40. Specifically, the lug 40 has a surface area 48 which is curved in a direction transverse to the direction of movement of the books and in a manner corresponding to the curve of the pusher finger blades 30, 31 and 32. As a result, the surface area 48 of the lug 40 provides for a full surface area contact between the blades and the lug.

As the books exit from the stitcher mechanism 12, they move into the raceway 13 into a position to be picked up and moved by the conveyor mechanism 14. As illustrated in FIG. 2, the raceway 13 comprises a U-shaped guide which engages the bottom of the books. The books are engaged also between guide members 51, 52, 53 and 54 located on opposite sides of a book. A book is positioned on the raceway 13 between the guides 51–54 as it exits from the stitcher 12. When a book is so positioned, a pusher finger construction engages a rear surface 55 of the book. The pusher finger construction 22 will thus push the book along the raceway 13 until the book is pushed into the infeed conveyor mechanism for the binder 15. The chain conveyor 20 being continuous will then move the pusher finger construction 22 back in a return path so as to pick up and engage another book, exiting from the stitcher 12. In this manner a continuous flow of books is provided between the stitcher 12 and the binder 15.

In the event that a particular book becomes jammed and thus provides a high resistance to movement, the pusher finger construction 22 will bend rearwardly into a position such as the dotted line position shown in FIG. 2. The pusher finger construction 22 will bend rearwardly relative to the direction of movement of the conveyor 20 and into a position where the pusher finger construction 22 can pass beyond the book that is jammed. Once it passes beyond the jammed book, the pusher finger construction 22 being resilient will snap back into the full line position, such as shown in FIG. 2.

The upper surface of the lug 40 is also curved in a manner complementary to the concave curve of the pusher finger blades 30, 31 and 32. Thus, when the blades are moved or bent backwardly against the lug 40, the blades have a surface area contact with the lug 40. Also, as shown in FIG. 2, the lug 40 is curved in a direction parallel to the direction of movement of the book and accordingly, when the pusher finger construction 22 is bent rearwardly, the pusher finger construction 22 will bend around that surface of the lug. Accordingly, when the pusher finger construction is bent rearwardly around the lug 40, a surface area contact is maintained between the pusher finger construction 22 and the lug 40. Thus, there is no tendency for stresses or the like to be encountered by the pusher finger construction 22.

Accordingly, it should be apparent that the present invention provides an improved mechanism for transferring books or the like between work stations in a bindery, and in particular, provides a simple and reliable way in which books may be moved between the various work stations in a bindery. Further, the construction is such that the force necessary to cause bending of the pusher finger construction rearwardly due to a jam can be varied by merely varying the number of blades forming the pusher finger construction. Obviously, if one of the blades 30, 31 or 32 was eliminated, the force at which the pusher finger construction would deflect would be lower, and accordingly, the construction is such that this can be adjusted for handling of different sized books or the like. Further, the construction is such that stresses in the blades 30, 31 and 32 forming the pusher finger construction are minimized due to the particular construction of the lug 40 which attaches the pusher finger construction to the conveyor chain and around which the pusher finger construction bends when bending backwardly in order to pass a jammed book.

Having defined my invention, I claim:

1. A mechanism for transferring books between work stations in a bindery comprising a conveyor chain, a raceway located along said conveyor chain and for supporting books thereon, a plurality of pusher means projecting from said conveyor chain, each said pusher means having a surface spaced above said raceway for engaging a surface of a respective book to push same along said raceway, a plurality of lugs secured to said conveyor chain, fastener means for securing each of said pusher means to a respective lug, each of said pusher means comprising a pusher finger construction for bending backwardly relative to the direction of movement thereof upon encountering a predetermined resistance to movement of a book being pushed thereby and for passing beyond said book providing said predetermined resistance due to being moved by said conveyor chain, each of said pusher finger constructions comprising at least one deflectable blade projecting in cantilever fashion from a respective lug over said raceway when pushing a book therealong and thus bending backwardly and toward said conveyor when encountering said predetermined resistance, said blade being curved in cross section in a direction transverse to the direction of book movement, each of said lugs having a surface portion which is correspondingly curved and said blades engaging said correspondingly curved surface portion when moving a book, each of said lugs having a further surface portion curved in a direction parallel to the direction of conveyor movement and providing a curved surface portion around which said blade bends when encountering said predetermined resistance, said further surface portion also being curved to correspond with the curve of said blade in a direction transverse to the direction of book movement.

2. A mechanism as set forth in claim 1 wherein said pusher finger construction comprises a plurality of resiliently deflectable blades of equal length having major surfaces in abutting engagement, one of said major surfaces of one of said blades engaging a book to push the book along said raceway, and all of said blades being correspondingly curved in a direction transverse to the direction of book movement.

* * * * *